Dec. 14, 1965    W. R. SNOOK, JR    3,223,365
CONTROL MECHANISM
Filed Jan. 30, 1964
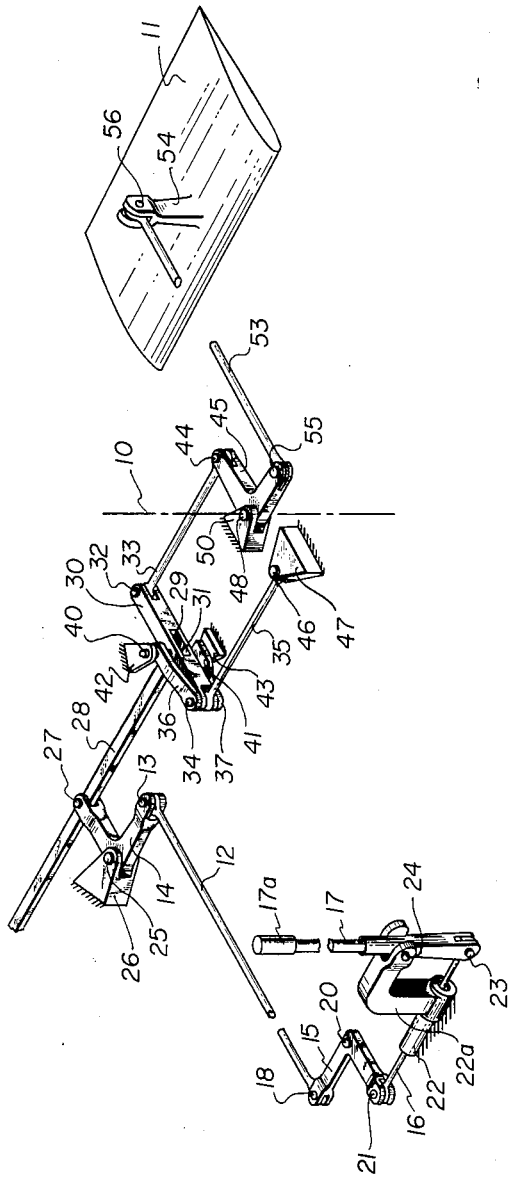
INVENTOR.
WILLIAM R. SNOOK, JR
BY *Ronald W. Mayes*
ATTORNEY

United States Patent Office 3,223,365
Patented Dec. 14, 1965

1

3,223,365
CONTROL MECHANISM
William R. Snook, Jr., 3908 E. Funston, Wichita, Kans.
Filed Jan. 30, 1964, Ser. No. 341,290
13 Claims. (Cl. 244—90)

This invention relates to a control mechanism. More particularly, this invention relates to a control mechanism for controlling from a remote position an element movably connected to a pivotally mounted member.

An object of this invention is the provision of a novel, simple, low cost, reliable control mechanism comprising a mechanical linkage for controlling from a remote position an element movably connected to a pivotally mounted member, wherein the given position of the movable element relative to the pivotal member is substantially maintained during and after pivotal movement of the member.

A further object of this invention is the provision of a novel control mechanism comprising a mechanical linkage interconnecting an actuating member with an element movably connected to a pivotally mounted member, wherein the element will be moved substantially the same angular or incremental distance for a given angular or incremental deflection of the actuating member regardless of the relative pivotal movement or position of the member within a range of approximately thirty-five degrees.

Another object of this invention is to provide a novel control mechanism comprising a mechanical linkage providing a simple and reliable pivot wing carried control surface operating mechanism operative throughout a range of wing pivot adjustment and providing positive and substantially uniform control of the control surface regardless of the pivotal position of the wing within that range.

Yet another object of the invention is the provision of a novel economical and reliable control surface control mechanism for a pivot wing whereby control effectiveness of the control surface is most favorably retained in all pivotal positions of the wing within a range of approximately thirty-five degrees.

A still further object of this invention is the provision of a novel mechanism controlling the pivotal movements of a pivotal wing carried control surface whereby equal movements of an actuating member give substantially proportional movements of the operable control surface, such as an aileron, throughout a pivot range of the wing.

The invention further resides in certain novel features of construction, combinations, and arrangements of parts and further objects and advantages of the invention will be apparent to those skilled in the art to which it pertains from the following description of the present preferred embodiment thereof described with reference to the accompanying drawing, which forms a part of this specification, and in which:

The drawing shows a pictorial sketch of a control mechanism embodying the invention.

It is to be understood that the invention is not limited to the details of construction and the arrangements of parts shown in the drawing and hereinafter described in detail, but is capable of being otherwise embodied and of being practiced and carried out in various ways. It is to be further understood that the terminology employed herein is for the purpose of description and there is no intention to herein limit the invention beyond the requirements of the prior art.

Referring to the drawing, reference numeral 10 indicates a pivot axis that for purposes of illustrating and describing the best mode of carrying out the invention, is shown to be a vertical pivot axis of a pivotally mounted member, such as that of a variable sweep aircraft wing.

2

It is to be understood that the wing pivot axis 10 can be made substantially horizontal so that the wing can be rotated up and down for enhancing the lateral stability of an aircraft. Alternatively, the wing pivot axis 10 can be horizontal and disposed substantially parallel to the span of the wing so that the wing can be rotated about a substantially horizontal laterally extended axis such as may occur in vertical or short takeoff and landing, VTOL or STOL, type of aircraft. It is to be further understood, in addition to the above, that the wing pivot axis 10 can be oriented at any desired attitude in space without loss of effectiveness or utility of this invention. This invention is suitable for use, without loss of effectiveness or any of the advantages thereof, in any pivot wing aircraft requiring the manipulation of an element movably connected to the wing, such as an airfoil, control surface, or other element carried by the wing. The movable element will always retain its given position relative to the wing and remain operable throughout any pivotal movement given the wing and at all wing pivot positions. It is also to be understood that the wing may be on a submarine, an aircraft, a space vehicle, a land or water surface vehicle, or stationary or portable equipment.

For purposes of clarity in the description of applicant's invention, only the relevant structure of applicant's novel linkage is shown with practically none of the extraneous structure of the pivotally mounted member or the structure carrying the pivotally mounted member being included in this specification or the drawing.

A movable pivot pin is herein defined as a pivot pin that does not have a fixed spatial location. A fixed pivot pin is herein defined as a pivot pin having a fixed spatial location. The pivot pins, whether fixed or movable, may, if desired, be adapted to pivot or to not pivot. It will also be understood that push-pull rods are referred to herein as push rods.

Referring to the drawing, the fixed pivot axis 10 defines a pivot axis for a variable sweep port wing of an airplane, not shown. The pivot axis of a starboard wing, not shown, would be substantially parallel with the port wing pivot axis 10 and laterally disposed on the starboard side of a conventional airplane fuselage. A movable element 11, preferably a port aileron, is movably connected to, and more specifically, pivotally connected to the port wing in a conventional manner, not shown. A control input push rod 12 is shown extending fore and aft of the aircraft fuselage, not shown, with its aft end pivotally connected by a movable pivot pin 13 to one arm of a bellcrank 14. The other end of a control input push rod 12 is, for purposes of illustration, connected via a bellcrank 15 and a transverse push rod 16 to an actuating member, such as a control stick 17 that may be pilot operated or automatic pilot operated in a known manner.

More particularly, the forward end of the control input push rod 12 is pivotally connected to one arm of the bellcrank 15 by a movable pivot or pintle pin 18. The bellcrank 15 is pivotally connected at the bight or midportion thereof, to the fuselage, not shown, with a fixed pivot or pintle pin 20. The other arm of the bellcrank 15 is pivotally connected to an outer end of the transverse push rod 16 by a movable pivot or pintle pin 21. The transverse push rod is slidably guided and supported at a midportion thereof in a sleeve 22 connected to the fuselage. The sleeve 22 is shown as fixed in the drawing for purpose of illustration only. However, it is to be understood that the sleeve 22 can be journaled in a conventional manner so that the control stick 17 can be pivoted fore and aft to effect pitch control of the aircraft through suitable conventional linkage means. The inner or other end of the push rod 16 is disposed within a clevis-like lower end of the control stick 17 and pivotally connected thereto by a movable pivot pin 23.

A handgrip 17a is provided at the upper end of the stick 17 for being grasped by an operator or pilot. By moving the stick from side to side, the transverse push rod 16 is moved to and fro in the sleeve 22. The sleeve 22 has a bellcrank-shaped support arm 22a extending upwardly and laterally to the port side for being pivotally connected to, and supporting a midportion of the control stick 17 by a fixed pivot pin 24. The upper end of the support arm 22a is clevis-shaped for straddling the control stick 17. It is to be understood that the control stick 17 is also generally used to control the elevators of the aircraft, but since this does not form a part of the embodiment being described, this additional control mechanism and linkage are not illustrated.

The bellcrank 14 is pivotally connected at the midportion thereof by a fixed pintle or pivot pin 25 to a fixed clevis 26 fixed to and carried by the aircraft fuselage, not shown. The other arm of the bellcrank 14 is pivotally connected by a movable pintle or pivot pin 27 to a midportion of a transverse slide or driver arm 28. The port side end of the slide arm 28 is pivotally connected by a movable pintle or pivot pin 29 to a midportion of a bellcrank 30. Preferably, the end of the slide arm 28 is disposed within a slot 31 formed in the mid-section of the bellcrank 30. The bellcrank 30 has its aft end pivotally connected by a movable pintle or pivot pin 32 to a driver intermediate push rod 33. The opposite or forward end of the bellcrank 30 is pivotally connected by a movable pintle or pivot pin 34 to a driven intermediate push rod 35 disposed parallel to the push rod 33. The end of the bellcrank 30 carrying the pin 34 is secured by a pair of symmetrically and oppositely disposed yoke-forming linkages 36 and 37 at the outer ends thereof. The pin 34 passes through the linkage 36, the bellcrank 30, the push rod 35, and the linkage 37. The opposite ends of the linkages 36 and 37 are respectively connected to coaxial fixed pintle or pivot pins 40 and 41 that are respectively carried by fixed support flanges 42 and 43. The flanges 42 and 43 are fixed to the fuselage of the aircraft.

The opposite ends of the intermediate push rods 33 and 35 are respectively pivotally connected to a movable pintle or pivot pin 44 carried by an arm of a driver bellcrank 45, and a movable pintle or pivot pin 46 carried by a driven support clevis or arm 47. The arm 47 is fixed to the aircraft wing. The arm 45 is connected by a fixed pintle or pivot pin 48 to a clevis 50 fixed to the aircraft wing. The arm 45 independently pivots about the pin 48 having a vertical axis coinciding with the wing pivot axis 10.

When aileron input push rod 12 is shifted forwardly by tilting the grip 17a of the control stick 17 for left bank in a counterclockwise direction about the pivot pin 24 to the starboard side of the aircraft, the bellcrank 14 is caused to pivot in a clockwise direction about the pivot pin 25. The forward shift of the push rod 12 results in the slide or driver arm 28 being driven laterally toward the port wing, which causes the bellcrank 30 and the driver push rod 33 to also be moved laterally in the port direction. Accordingly, the driver push rod 33 drives the driver bellcrank 45 in a clockwise direction about the pivot pin 48. Angular clockwise motion of the bellcrank 45 is imparted to the aileron 11, causing the aileron to tilt upwardly for a left bank, through an output push rod 53. The linear motion of the push rod 53 is delivered to the aileron 11 via an actuating horn on arm 54 fixed to the aileron 11. One end of the push rod 53 is connected to the bellcrank 45 by a movable pintle or pivot pin 55. The opposite end of the push rod 53 is pivotally connected to the aileron actuating arm 54 by a movable pivot pin 56.

The aileron control element means, therefore, comprise the elements involved in transmitting motion from the control stick 17 to the aileron 11 via the push rod 12, the driver bar 28, the bellcrank 30, the driver rod 33, the driver bellcrank 45, the output rod 53, and the aileron actuating arm 54.

Wing pivot feedback loop or wing sweep compensation control element means comprise a driven horn or arm 47, and the intermediate rod 35. The driver arm 47, as pointed out hereinabove, is rigidly connected to outboard wing structure so as to be driven by any movement of the wing through the same angular increment as the wing. Movement of the arm 47 is transmitted to the pin 34 in the forward end of the crank 30 by the rod 35, causing the crank 30 to pivot about the pin 29. This changes the angular position of the crank 30 by changing the length of the moment arm between the pivot pin 34 and the longitudinal center line of the bar 28. The rods 33 and 35 are maintained substantially parallel to each other and therefore describe a parallelogram linkage pattern. The pivot pins 44 and 46 are equally spaced from the wing pivot axis 10 and the pivot pin 48. Preferably, when the control stick 17 is in neutral position the crank 30 is perpendicularly disposed to the rods 33 and 35 so that a right parallelogram or rectangular linkage is formed.

The compensating feedback movement to the crank 30 that is transmitted back through the rod 33 and the driver crank 45 from the arm 47 and the rod 35 causes the push rod 53 and the aileron 11 to maintain the positions thereof relative to the outboard wing structure regardless of wing pivot or sweep position.

It will be noted that the amount of feedback relative to the amount of wing pivot or sweep can be varied by altering the distance between the pivot pins 44 and 46, or either of the distances between the pin 44 and the pin 48, or the pin 46 and the pin 48. It is also to be understood that intentional aileron motion as a function of wing pivot or swep can be accomplished if the distance between the pin 44 and the pin 48 is different than the distance between the pin 46 and the pin 48.

It will be noted that the invention, in its preferred form, provides only approximate linearity of movement between the control stick 17 and the aileron 11. There will be a slight increase of incremental or angular movement of the aileron per increment of stick movement as the stick 17 is moved away from neutral position, providing the rods 33 and 35 are perpendicular to each radius passing through the pivot pins 44 and 46, respectively, when the control stick 17 is in neutral position.

It is noteworthy that the control stick 17 can be moved to the left or in a counterclockwise direction as viewed from the front of the aircraft so as to cause the aileron or control surface 11 to tilt upwardly so as to accommodate a left bank of the aircraft. However, it is to be understood that by reversing either the bellcranks 14 or 15, or by moving the horn 54 to the underside of the control surface 11, a movement of the control stick 17 to the left in a counterclockwise direction will result in the aircraft being banked to the right.

The invention disclosed is suitable for use where wing sweep is to be relatively small, for example thirty-five degrees due to inherent characteristics thereof. However, if wing sweep is to be large, for example sixty-five degrees, the invention disclosed in co-pending U.S. patent application S.N. 341,291 filed January 30, 1964 entitled "Control Mechanism" of William R. Snook, Jr., may be more desirable.

It will be understood that this invention can be modified to adapt it to various circumstances and conditions, and it is accordingly desired to comprehend within the purview of this invention such modifications as may be considered to fall within the scope of the appended claims.

What is claimed, is:

1. In an aircraft having at least one wing member pivotally connected to a fuselage and an aileron element movably connected to the wing member, a control mechanism for the element comprising, first crank means, first push rod means having one end pivotally connected to one end of said first crank means, second push rod means having one end pivotally connected to another end of said first crank means, transverse slide bar means having one end pivotally connected to said first crank means intermediate the ends thereof, said transverse slide bar means being adapted to receive element control input motion, yoke means pivotally anchored to the fuselage and said other end of said first crank means pivotally connected thereto within the yoke thereof, first control motion transfer means pivotally connected to said first push rod means and to the aileron element for transmitting control input motion from said first push rod means to the aileron element, and wing member movement feedback means pivotally connected to said second push rod means and to the pivotally connected wing member for feeding back pivotal movement of the wing member to said second push rod means.

2. In an aircraft having at least one wing member pivotally connected to a fuselage and an aileron element movably connected to the wing member, a control mechanism for the element comprising, first crank means, first push rod means having one end pivotally connected to one end of said first crank means, second push rod means having one end pivotally connected to another end of said first crank means, slide bar means having one end pivotally connected to said first crank means intermediate the ends thereof, said transverse slide bar means being adapted to receive element control input motion, arm means pivotally anchored to the fuselage, said other end of said first crank means being pivotally connected to said arm means, first control motion transfer means pivotally connected to said first push rod means and to the aileron element for transmitting control input motion from said first push rod means to the aileron element, and wing member movement feedback means pivotally connected to said second push rod means and to the pivotally connected wing member for feeding back pivotal movement of the wing member to said second push rod means.

3. In an aircraft, pivotally mounted member means having a pivot axis, element means movably connected to said member means, remote control means controlling the position of said element means relative to said member means from a remote position, and feedback loop control means for substantially maintaining the position of said element means relative to said member means throughout a predetermined range pivotal movement of said member means relative to the aircraft, and said remote control means and said feedback loop means including, crank means, first means pivotally connected to said crank means, second means pivotally connected to said crank means, third means pivotally connected to said crank means for transmitting control input motion to said crank means and said first means, fourth means carried by the aircraft pivotally connected to said crank means, fifth means pivotal about said pivot axis of said member means and pivotally connected to said first means, control motion transfer means connected to said fifth means and to said element means for transmitting control input motion from said first means to said element means, and said second means being connected to said member means for transmitting pivotal movement of said member means to said element means through said crank means and said first means and said control motion transfer means.

4. A control mechanism for controlling the position of element means movably connected to pivotally mounted member means comprising, remote control means for controlling the position of the element means relative to the member means, and feedback loop control means for substantially maintaining the position of the element means relative to the member means throughout a predetermined range of pivotal movement of the member means, and said remote control means and said feedback loop means including, crank means, first means pivotally connected to said crank means, second means pivotally connected to said crank means, third means pivotally connected to said crank means for transmitting control input motion to said crank means and said first means, fourth means pivotally connected to said crank means, fifth means pivotally connected to said first means, control motion transfer means connected to said fifth means and the element means for transmitting control input motion from said first means to the element means, and said second means being connected to the member means for transmitting pivotal movement of the member means to the element means through said crank means and said first means and said control motion transfer means.

5. A control mechanism as set forth in claim 4, wherein said predetermined range is approximately thirty-five degrees.

6. In an aircraft having at least one wing member pivotally connected to a fuselage and an aileron element movably connected to the wing member, a control mechanism for the element comprising, first crank means, first push rod means having one end pivotally connected to one end of said first crank means, second push rod means having one end pivotally connected to another end of said first crank means, transverse slide bar means having one end pivotally connected to said first crank means intermediate the ends thereof, said transverse slide bar means being adapted to receive element control input motion, yoke means pivotally anchored to the fuselage and said other end of said first crank means pivotally connected thereto within the yoke thereof, first control motion transfer means pivotally connected to said first push rod means and to the aileron element for transmitting control input motion from said first push rod means to the aileron element, wing member movement feedback means pivotally connected to said second push rod means and to the pivotally connected wing member for feeding back pivotal movement of the wing member to said second push rod means, second crank means having one end pivotally connected to said transverse slide bar means, third push rod means having one end pivotally connected to another end of said second crank means, said second crank means being pivotally connected to the fuselage, third crank means pivotally connected to the fuselage and having one arm pivotally connected to said third push rod means, fourth push rod means having one end pivotally connected to another arm of said third crank means, control stick means having a lower end portion pivotally connected to said fourth push rod means, and means slidably guiding and supporting said fourth push rod means, and said slide guide and support means having an upwardly extending arm pivotally connected to a midportion of said control stick means.

7. In an aircraft as set forth in claim 6, wherein said wing member movement feedback means includes a member fixed to the wing member adjacent to the pivotal connection of the wing member to the fuselage said second push rod means is pivotally connected to said fixed member, and said first and second push rod means are maintained substantially parallel to each other.

8. In an aircraft as set forth in claim 6, wherein said first control motion transfer means includes fourth crank means pivotally connected to the wing member along an axis coincidental with the pivotal connection of the wing member to the fuselage and said first push rod means is pivotally connected to said fourth crank means, second control motion transfer means pivotally connected to said fourth crank means and to the aileron element, and said first and second push rod means are maintained substantially parallel to each other.

9. In an aircraft having at least one wing member pivotally connected to a fuselage and an aileron element movably connected to the wing member, a control mechanism for the element comprising, first crank means, first push rod means having one end pivotally connected to one end of said first crank means, second push rod means having one end pivotally connected to another end of said first crank means, transverse slide bar means having one end pivotally connected to said first crank means intermediate the ends thereof, said transverse slide bar means being adapted to receive element control input motion, yoke means pivotally anchored to the fuselage and said other end of said first crank means pivotally connected thereto within the yoke thereof, second crank means pivotally connected to the wing member coaxial with the pivotal connection of the wing member to the fuselage, said first push rod means being pivotally connected to said second crank means, first control motion transfer means pivotally connected to said second crank means and to the aileron element for transmitting control input motion from said second crank means to the aileron element, and wing member movement feedback means comprising a member pivotally connected to said second push rod means and to the pivotally connected wing member for feeding back pivotal movement of the wing member to said second push rod means.

10. A mechanism for an element movably connected to a member pivotally connected to a frame comprising, first crank means, first push rod means having one end pivotally connected to one end of said first crank means, second push rod means having one end pivotally connected to another end of said first crank means, said first and second push rod means being substantially parallel to each other, bar means having one end pivotally connected to said first crank means intermediate the ends thereof, said bar means being adapted to receive control input motion, support means adapted to be pivotally anchored to the frame and said other end of said first crank means being pivotally connected to said support means, second crank means adapted to be pivotally connected to the member coaxial with the pivotal connection of the member to the frame, said second crank means being pivotally connected to said first push rod means, first control motion transfer means pivotally connected to said second crank means and to the element for transmitting control input motion from said second crank means to the element, and wing member movement feedback means pivotally connected to said second push rod means and to the pivotally connected member for feeding back pivotal movement of the member to said second push rod means.

11. A mechanism as set forth in claim 10, further comprising, third crank means having one end pivotally connected to said bar means, and third push rod means having one end pivotally connected to another end of said third crank means, and said third crank means being pivotally connected to the frame.

12. A mechanism as set forth in claim 11, further comprising, fourth crank means pivotally connected to the frame and having one arm pivotally connected to said third push rod means, and fourth push rod means having one end pivotally connected to another arm of said fourth crank means.

13. A mechanism as set forth in claim 12, further comprising, lever means having one end pivotally connected to said fourth push rod means, and means slidably guiding and supporting said fourth push rod means, and said slide guide and support means having an extended arm portion pivotally connected to said lever means.

References Cited by the Examiner
UNITED STATES PATENTS

| | | | |
|---|---|---|---|
| 2,646,234 | 7/1953 | Lindmalm et al. | 244—82 |
| 2,669,401 | 2/1954 | Bosserman | 244—82 |
| 2,985,408 | 5/1961 | Johnson | 244—90 X |
| 3,133,716 | 5/1964 | Halliwell | 244—75 |
| 3,138,354 | 6/1964 | Baetke | 244—90 |
| 3,142,459 | 7/1964 | Baetke | 244—90 |

FERGUS S. MIDDLETON, *Primary Examiner.*

ANDREW H. FARRELL, *Examiner.*